3,210,035
Patented Oct. 5, 1965

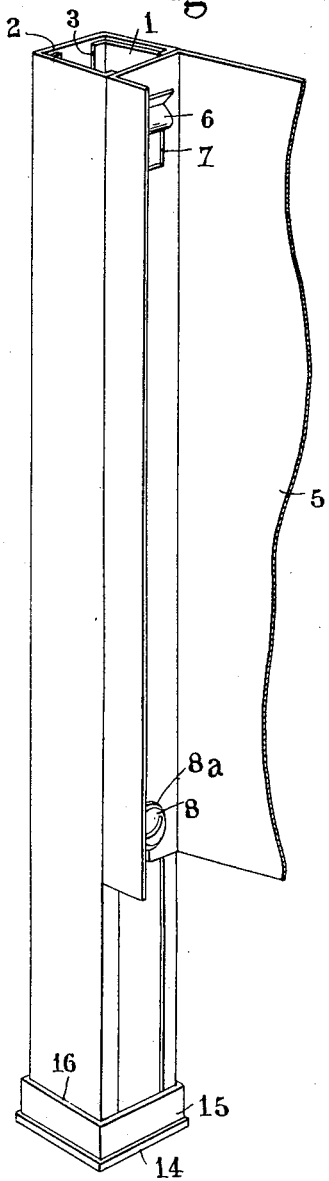
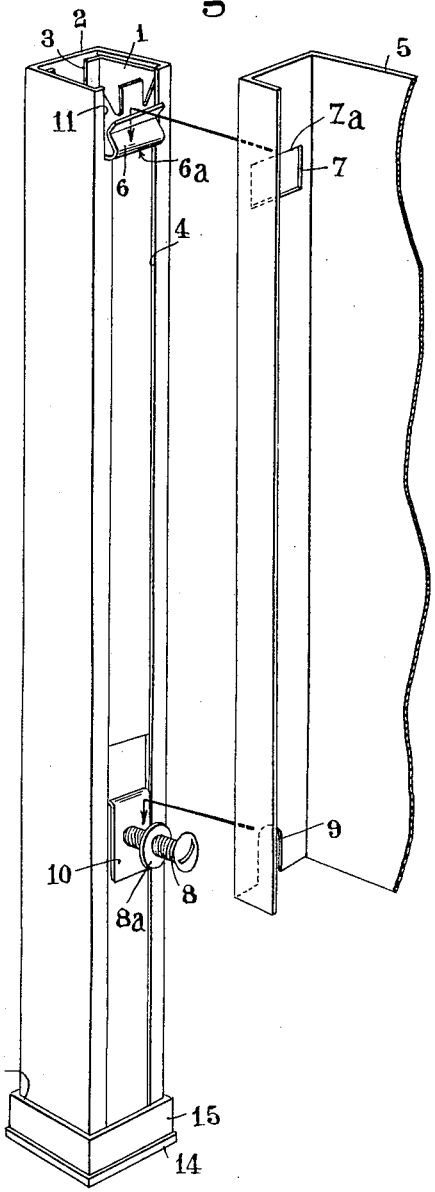

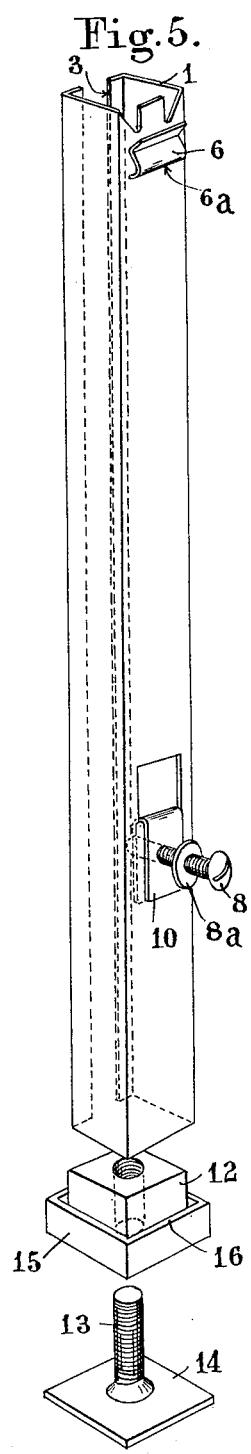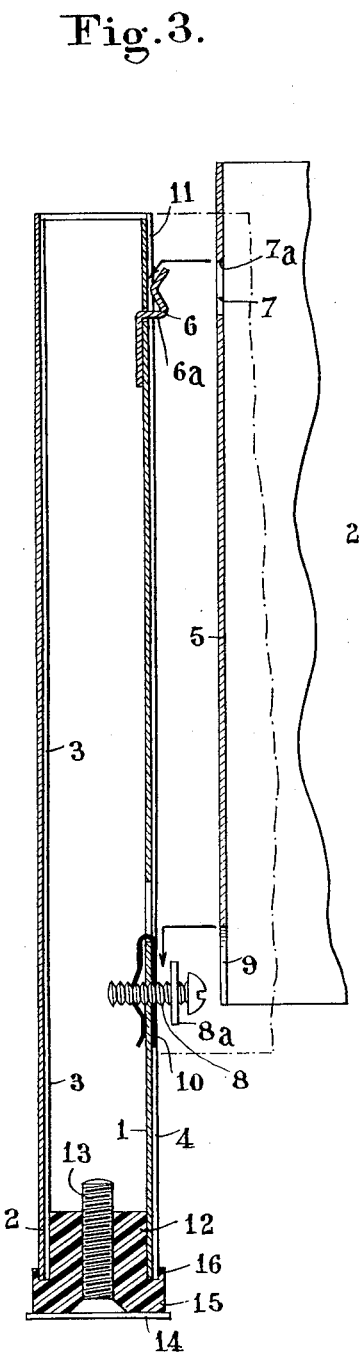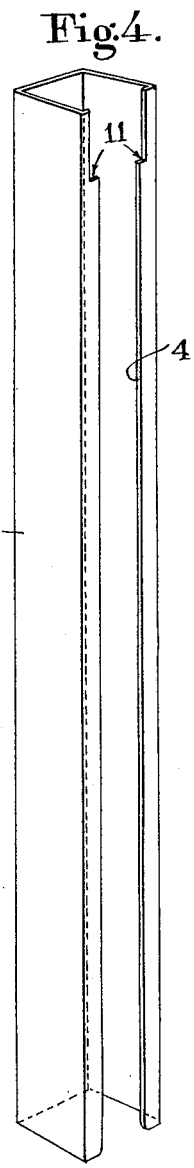

1

3,210,035
DETACHABLE FURNITURE LEG ASSEMBLY COMPRISING TELESCOPIC CHANNEL MEMBERS
René Vincens, Martin-Eglise Pres Dieppe, France, assignor to Societe Civile de Recherches et Etudes Industrielles, Neuville-les-Dieppe, France
Filed May 8, 1964, Ser. No. 366,004
Claims priority, application France, May 8, 1963, 934,082, Patent 1,364,089
3 Claims. (Cl. 248—188.8)

Detachable metal legs are well known for furniture, and especially for office furniture, so as to facilitate the manufacture, packaging, stocking and dispatch of this furniture.

These legs have the following advantages: facility of manufacture for volume production, easy assembly, perfect stability, and their resistance to heavy loads; they are usually made with a square or rectangular shape in cross section thereby providing high rigidity of these sections.

It is generally necessary to use big and expensive tooling to make these square tubes, which must then be treated once again for finishing.

The object of this invention is a detachable metal leg for furniture, and especially for office furniture, possessing all the required qualities described above, including facility of manufacture on conventional folding-machines. A feature of the invention is that it consists of a first metal telescoping channel member, the cross-section of which has a square or an open rectangular shape, conveniently attached to the wall of the piece of furniture along the side which is opposite to its opening. The first channel member is frictionally fitted in a second telescoping channel member of the same shape, which is used at the same time as a decorative finish, and the opening of which is turned towards the wall of the piece of furniture. These two telescoping channel members are closed at their lower end by an end-block forming a foot containing a small jack for adjusting the height, and this assembly of both open channel members constituting a closed tube of the same general cross-section.

The side of the inside channel member which appears in an opening of the outside channel member contains means of fastening it to the wall of the piece of furniture. These fastening means are preferably a tongue formed at the upper end of the back of the inside channel member designed to fit into an aperture pierced in the wall of the piece of furniture at a suitable height and a nut fixed lower down on this channel member and into which a locking screw, fitted into a notch in the side of the piece of furniture is screwed.

A more detailed description will be given hereinafter, purely as an example and implying no limitation, of a preferred mode of manufacturing the leg which is the object of the present invention, with reference to the drawing attached, on which:

FIGURE 1, is a perspective view of a leg fixed to the body of a piece of furniture, the latter being represented exploded.

FIGURE 2 is a perspective view showing a leg at the moment of its fixing onto the piece of furniture.

FIGURE 3 is a vertical section of the leg of a piece of furniture, before attachment of the leg, the position of the piece of furniture after attachment of the leg being shown as a dotted line.

FIGURE 4 is a perspective view of the outside channel member of the leg in accordance with the invention.

FIGURE 5 is a perspective view of the inside channel member of a leg according to the invention and a jack-equipped end block before it is fitted to the end of the outside member.

2

This leg is composed of two distinct elements interlocking one into the other and forming a square or rectangular tube.

The leg comprises an inside element or channel member 1 which consists of a strip of sheet steel folded four times at right angles and thus having two flanges with a web connecting the flanges and an open space opposite the web.

An outside element or channel member 2, of the same shape, is provided for forming the leg and consists of a strip of decorative material, the finished surface of which is not touched after folding; the sides of this outside section are calculated in such a way that it can co-operate telescopically with the inside section or channel member 1 of the leg without play and without forcing it.

These two channel members are telescopically assembled so that the opening 3 of the inside section or channel member 1 is closed by the side or web of the outside section or channel member 2 opposite to its opening 4.

The inside channel member 1 is fixed at its upper part to the body 5 of a piece of furniture by a curved tongue directed upwards which can fit into an opening 7 of the said body, and its lower part by a screw 8 with a washer 8a fitted into the aperture 9 of body 5, open towards the bottom, engaged in the threads of a nut 10 in this element.

The tongue 6 is formed by a part inserted, or fixed thereon, into element 1 and having a flat supporting surface 6a designed to receive and transmit the vertical efforts transmitted by the upper part 7a of the opening 7 situated on the side of the piece of furniture to which the leg is to be attached. The screw 8 with its washer 8a is designed to assure the tightening of channel member 1, using the marginal edge portions around the aperture 9 and the nut 10 which is inside the channel member.

The upper part of the side of the outside element or channel member 2 presenting opening 4 is provided with a notch 11 into which the tongue 6 of the inside element or channel member 1 fits when the two channel members are assembled.

To fasten this leg onto a piece of furniture, after assembling the two channel members, tongue 6 is fitted into opening 7 of the side of the piece of furniture, the leg is pushed upwards, sliding screw 8 into the aperture 9 made in the lower part of the piece of furniture until the flat supporting surface 6a of the tongue 6 is blocked against the upper part 7a of the opening 7, then screw 8 is tightened to fix the leg into position, the outside channel member 2 is then held firmly, as its two wings bordering opening 4 are clamped between the inside channel member 1 and the body of the piece of furniture.

The leg is closed at its lower extremity by an end block 12 which forms a foot provided with an axial threaded bore to co-operate with screw 13 the head of which is in the form of a foot 14. This end-block has circumferential at its base a shoulder 15 on which the two elements 1 and 2 rest, and a casing 16 directed upwards surrounding the lower extremity of the outside element. The combination of the end block 12 and of the screw 13 form a small jack enabling perfect stability of the piece of furniture under any circumstance.

What I claim is:

1. A detachable metal leg for office furniture comprising, first and second telescoping channel members, each member including two flanges, a web connecting said flanges and an open space opposite said web, the web of the first channel member closing the open space of the second channel member, means for fastening the leg to a piece of furniture and fastened to the web of the first channel member and extending through the opening in the second channel member, and an end-block forming a foot and interlocking the two channel members at their base.

2. A detachable metal leg for office furniture comprising, first and second telescoping channel members, each member including two flanges, a web connecting said flanges and an open space opposite said web, the web of the first channel member closing the open space of the second channel member, means comprising a tongue for fastening the leg to a piece of furniture fastened to the web of the first channel member and extending through the opening in the second channel member, and an end-block forming a foot and interlocking the two channel members at their base.

3. For use on office furniture comprising a body portion having a tongue-receiving opening, for attaching a leg thereto and a lower notch, the improvement which comprises, a detachable metal leg comprising, first and second telescoping channel members, each member including two flanges, a web connecting said flanges and an open space opposite said web, the web of the first channel member closing the open space of the second channel member, a tongue received in said body portion tongue-receiving opening for fastening the leg to said body portion of said piece of furniture, said tongue being fastened to the web of the first channel member and extending through the opening in the second channel member, an end-block forming a foot and interlocking the two channel members at their base, said body and a support fixed to the second channel member and extending through the opening of said second channel member for supporting said body portion thereon including means received in said notch and clamp means to clamp the leg to said body portion.

References Cited by the Examiner

UNITED STATES PATENTS

| | | | |
|---|---|---|---|
| 512,992 | 1/94 | Ritchey | 248—188 |
| 2,006,502 | 7/35 | Hallowell | 248—188.8 |
| 2,842,417 | 7/58 | Scanlow | 248—188.8 |
| 3,052,058 | 9/62 | Walsh et al. | 248—188.8 |
| 3,071,400 | 1/63 | Bellock | 211—182 |

CLAUDE A. LE ROY, *Primary Examiner.*